(12) United States Patent
Yin et al.

(10) Patent No.: US 11,875,282 B2
(45) Date of Patent: *Jan. 16, 2024

(54) DEVICE, SYSTEM AND METHOD FOR MODE-BASED SYNCHRONIZATION OF DATA RECORDS

(71) Applicant: AMADEUS S.A.S., Sophia Antipolis (FR)

(72) Inventors: Gerard Yin, Biot (FR); Pierre-Philippe Di Costanzo, Biot (FR); Olivier Daniel Bernier, Biot (FR); Stephane Lecourtois, Biot (FR)

(73) Assignee: AMADEUS S.A.S., Sophia Antipolis (FR)

( * ) Notice: Subject to any disclaimer, the term of this patent is extended or adjusted under 35 U.S.C. 154(b) by 0 days.

This patent is subject to a terminal disclaimer.

(21) Appl. No.: 18/093,093

(22) Filed: Jan. 4, 2023

(65) Prior Publication Data
US 2023/0147898 A1     May 11, 2023

Related U.S. Application Data

(63) Continuation of application No. 16/935,911, filed on Jul. 22, 2020, now Pat. No. 11,580,462.

(30) Foreign Application Priority Data

Jul. 30, 2019    (FR) ...................................... 1908663

(51) Int. Cl.
    *G06Q 10/00*        (2023.01)
    *G06Q 10/02*        (2012.01)
    (Continued)

(52) U.S. Cl.
    CPC ......... *G06Q 10/02* (2013.01); *G06F 16/2379* (2019.01); *G06F 16/27* (2019.01);
    (Continued)

(58) Field of Classification Search
None
See application file for complete search history.

(56) References Cited

U.S. PATENT DOCUMENTS

2002/0107991 A1    8/2002   Maguire et al.
2002/0178034 A1   11/2002   Gardner et al.
(Continued)

FOREIGN PATENT DOCUMENTS

FR           3067490 A1    12/2018
WO     2016061675 A1     4/2016

OTHER PUBLICATIONS

Masha et al. "Peer-to-Peer Transactional Replication—SQL Server | Microsoft Docs", Aug. 29, 2016, URL: https://docs.microsoft.com/en-us/sql/relational-databases/replication/transactional/peer-to-peer-transactional-replication?view=sql-server-ver15.
(Continued)

*Primary Examiner* — Tonya Joseph
(74) *Attorney, Agent, or Firm* — PERRY + CURRIER, INC.

(57) ABSTRACT

A device, system and method for mode-based synchronization of data records is provided. Booking data is received, at one or more computing devices, from one of a first and second client device. When received from the first client device, in a first order mode for the booking data, the device(s): cause an order management system (OMS) to generate: order data at a first database; and cause a legacy system to generate a corresponding passenger name record (PNR) at a second database, the corresponding PNR being one-way synchronized to the order data. When received from the second client device, in a legacy mode for the booking data, the device(s): cause the legacy system to generate, a PNR and/or ticket data at the second database; and cause the OMS to generate corresponding order data at
(Continued)

the first database, the corresponding order data being one-way synchronized to the PNR and/or the ticket data.

20 Claims, 8 Drawing Sheets

(51) Int. Cl.
*G06F 16/27* (2019.01)
*G06F 16/23* (2019.01)
*G06Q 20/04* (2012.01)
*G06Q 20/32* (2012.01)
*G06Q 30/0601* (2023.01)
*G06Q 50/14* (2012.01)

(52) U.S. Cl.
CPC ....... *G06Q 20/0457* (2013.01); *G06Q 20/322* (2013.01); *G06Q 30/0633* (2013.01); *G06Q 50/14* (2013.01)

(56) References Cited

U.S. PATENT DOCUMENTS

| | | |
|---|---|---|
| 2006/0206363 A1 | 9/2006 | Gove |
| 2009/0298489 A1 | 12/2009 | Chitturi et al. |
| 2010/0077027 A1 | 3/2010 | Chitturi et al. |
| 2012/0239620 A1 | 9/2012 | Masini et al. |
| 2012/0239724 A1 | 9/2012 | Masini et al. |

OTHER PUBLICATIONS

Masha et al. "Filter Published Data—SQL Server." SQL Server | Microsoft Docs, Mar. 14, 2017, URL: https://docs.microsoft.com/en-us/sql/relational-databases/replication/publish/filter-published-data?view=sql-server-ver15.

Anonymous "Multi-Master Replication." Wikipedia, Wikimedia Foundation, May 29, 2019, URL: https://en.wikipedia.org/w/index.php?title=Multi-master_replication&oldid=899498855.

Anonymous, Article: Sync Strategies Part 2: Two-Way Syncs—Dell Boomi Community, Oct. 28, 2018, URL: https://community.boomi.com/s/article/syncstrategiespart2twowaysyncs.

DEVICE, SYSTEM AND METHOD FOR MODE-BASED SYNCHRONIZATION OF DATA RECORDS

FIELD

The specification relates generally to data synchronization, and specifically to a system and method for mode-based synchronization of data records.

BACKGROUND The provision of various products, including for example travel-related goods and services (e.g. flights, hotel reservations, and the like) typically requires various discrete entities to exchange data defining various aspects of the products. Examples of such entities, in the context of travel-related products, include airlines, travel agencies, end users, reservation systems, and the like. Although such entities may be configured to exchange data according to a standardized format (e.g. according to the eXtensible Markup Language (XML)-based New Distribution Capability (NDC) standard in the context of travel-related products), they may nonetheless employ different mechanisms to initiate the exchange of data. Variability in synchronization mechanisms can lead to unsuccessful synchronizations, as well as time-consuming and costly configuration on the part of each entity to account for variations in synchronization mechanisms.

SUMMARY

An aspect of the present specification provides a computing device comprising: at least one controller configured to communicate with: a first client device and an order management system (OMS) communicating with a first database; and a second client device and a legacy system communicating with a second database, the at least one controller further configured to: receive, from one of the first client device and the second client device, booking data; when the booking data is received from the first client device, in a first order mode for the booking data: cause the OMS to generate: order data at the first database; and cause the legacy system to generate a corresponding passenger name record at the second database, the corresponding passenger name record being slaved to the order data; and when the booking data is received from the second client device, in a legacy mode for the booking data: cause the legacy system to generate, one or more of a passenger name record and ticket data at the second database; and cause the OMS to generate corresponding order data at the first database, the corresponding order data being slaved to the one or more of the passenger name record and the ticket data.

Another aspect of the present specification provides a method comprising: receiving, at one or more computing devices, from one of a first client device and a second client device, booking data; when the booking data is received from the first client device, in a first order mode for the booking data: causing, via the one or more computing devices, an order management system (OMS) to generate: order data at a first database; and causing, via the one or more computing devices, a legacy system to generate a corresponding passenger name record at a second database, the corresponding passenger name record being slaved to the order data; and when the booking data is received from the second client device, in a legacy mode for the booking data: causing, via the one or more computing devices, the legacy system to generate, one or more of a passenger name record and ticket data at the second database; and causing, via the one or more computing devices, the OMS to generate corresponding order data at the first database, the corresponding order data being slaved to the one or more of the passenger name record and the ticket data.

Another aspect of the present specification provides a non-transitory computer-readable medium storing a computer program, wherein execution of the computer program is for: receiving, at one or more computing devices, from one of a first client device and a second client device, booking data; when the booking data is received from the first client device, in a first order mode for the booking data: causing, via the one or more computing devices, an order management system (OMS) to generate: order data at a first database; and causing, via the one or more computing devices, a legacy system to generate a corresponding passenger name record at a second database, the corresponding passenger name record being slaved to the order data; and when the booking data is received from the second client device, in a legacy mode for the booking data: causing, via the one or more computing devices, the legacy system to generate, one or more of a passenger name record and ticket data at the second database; and causing, via the one or more computing devices, the OMS to generate corresponding order data at the first database, the corresponding order data being slaved to the one or more of the passenger name record and the ticket data.

BRIEF DESCRIPTIONS OF THE DRAWINGS

For a better understanding of the various examples described herein and to show more clearly how they may be carried into effect, reference will now be made, by way of example only, to the accompanying drawings in which.

DETAILED DESCRIPTION

The provision of various products, including for example travel-related goods and services (e.g. flights, hotel reservations, and the like) typically requires various discrete entities to exchange data defining various aspects of the products. Examples of such entities, in the context of travel-related products, include airlines, travel agencies, end users, reservation systems, and the like. Although such entities may be configured to exchange data according to a standardized format (e.g. according to the eXtensible Markup Language (XML)-based New Distribution Capability (NDC) or ONE Order™ standards in the context of travel-related products), by communicating with an Order Management System (OMS), many of those entities may be required to also interact using interfaces previously provided by a Passenger Services System (PSS). Hence as described herein, an OMS and a PSS may run simultaneously, and various entities and/or devices thereof, interact with the OMS and the PSS using respective sets of interfaces (i.e. respective to the OMS and the PSS). To manage a booking (e.g. servicing of a booking, fulfilment of a booking, etc.), in both the OMS and the PSS, extensive synchronization may occur between the records generated in the OMS and the PSS. However, current synchronization mechanisms may lead to unsuccessful booking synchronizations between the OMS and the PSS, including issues like conflicting updates or race conditions between these two systems.

Figure 1:
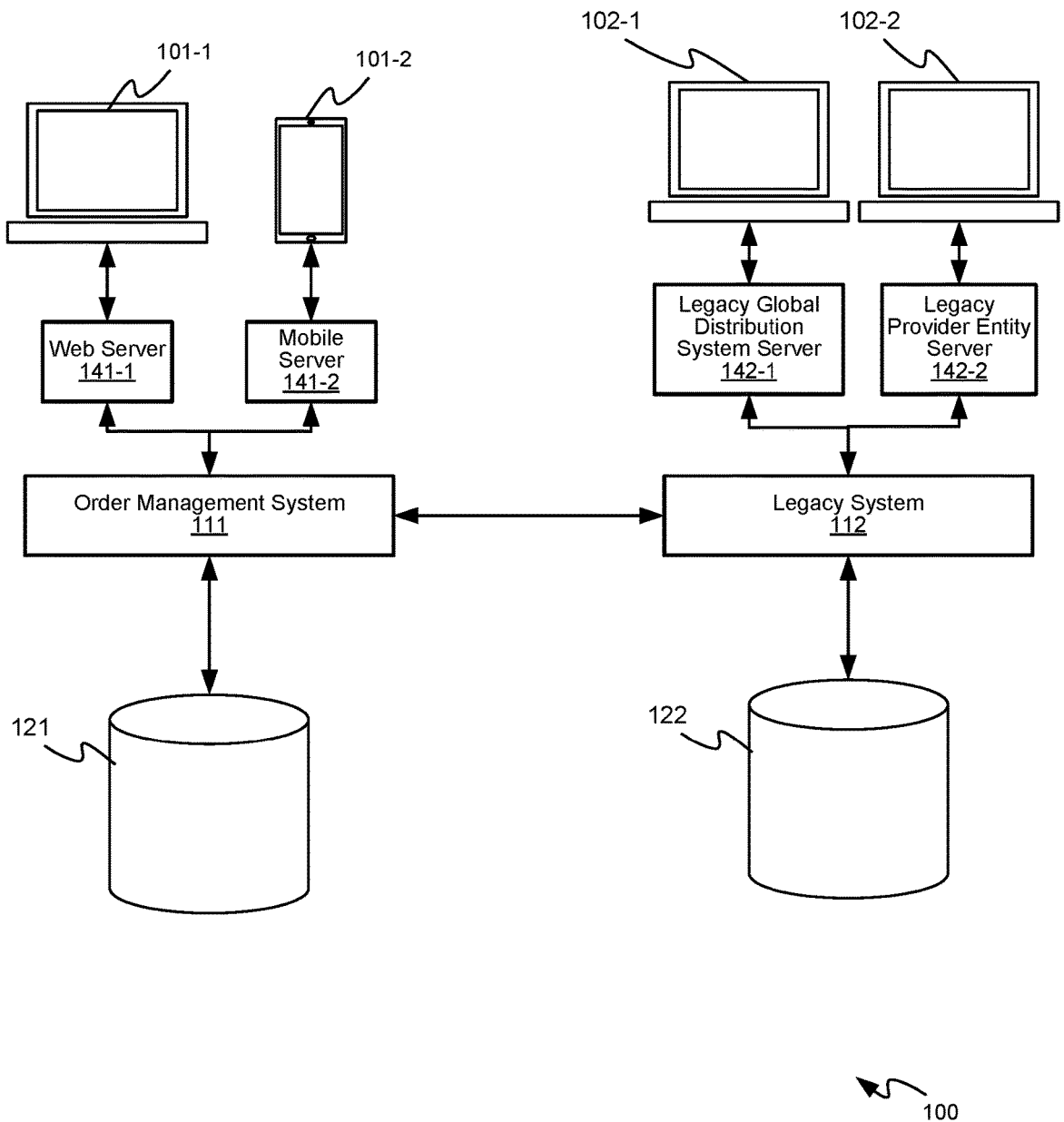
FIG. 1 depicts a system for mode-based synchronization of data records, according to non-limiting examples.

Attention is hence directed to FIG. 1 which depicts a system 100 for mode-based synchronization of data records, and in particular associated data records of different types. The data records, in the examples discussed herein, correspond to products such as travel-related goods and services (e.g. flights, hotel reservations, car rentals and the like). More specifically, the products discussed in the examples below may be flight tickets and related services (e.g. baggage check services, in-flight food, entertainment and the like). However, as will be apparent to those skilled in the art, the systems and methods discussed below can also be applied to various other types of data records.

Delivery of the products mentioned above is typically controlled by a provider entity, such as an airline in the case of the products discussed in connection with the examples provided herein. However, initiation of the products may occur via client devices which may be associated with a provider entity, a travel agency, users operating product ordering applications on devices and/or mobile devices, and the like. The system 100 generally includes a newer system for ordering the products; for example, devices of the newer system may exchange data according to a New Distribution Capability (NDC) standard. The system 100 further includes a legacy system for ordering the products; for examples, devices of the legacy system may exchange data according to a Global Distribution System (GDS)-based standard, for example using the Electronic Data Interchange For Administration, Commerce and Transport (EDIFACT) messaging standard. In general, different respective data records for a given product may be maintained by each of the systems, at different databases, and in particular, each system may maintain respective data records at respective databases for a particular product, such as a ticket and/or e-ticket sold to a passenger for a particular flight. As each system may attempt to make changes to the data records stored at the respective databases, for example in parallel with each other, synchronization of the data records at the respective databases may result in contradictory data being stored in the data records and/or synchronization of the data records may fail and/or the synchronization may be unsuccessful. Furthermore, the problem may be particular acute with databases associated with entities associated with travel industry, which is generally switching to the NDC standard from GDS-based standards, and some entities may be slower to switch than other entities. Hence the present specification generally provides a device, system and method for mode-based synchronization of data records of both newer systems and legacy systems to prevent and/or mitigate data record synchronization failure. In particular examples, a mode may be particular to a particular booking of a product, represented by booking data (e.g. an electronic request for a product); hence, booking data referred to herein may be operated and/or controlled in different modes, depending on a client device which originated the booking data.

The system 100 is next described in more detail. Communication links between components of the system 100 are depicted in FIG. 1, and throughout the present specification, as double-ended arrows between respective components; the communication links may include any suitable combination of wireless and/or wired links and/or wireless and/or wired communication networks.

The system 100 comprises at least one first client device 101-1, 101-2, at least one second client device 102-1, 102-2, an order management system (OMS) 111, a legacy system 112, a first database 121, and a second database 122. The at least one first client device 101-1, 101-2 will be interchangeably referred to hereafter, collectively, as the first client devices 101 and, generically, as a first client device 101; similarly, at least one second client device 102-1, 102-2 will be interchangeably referred to hereafter, collectively, as the second client devices 102 and, generically, as a second client device 102.

The first client devices 101 generally communicate with the OMS 111 via first servers 141-1, 141-2, including, but not limited to, a web server 141-1 and a mobile server 141-2. The servers 141-1, 141-2 will be interchangeably referred to hereafter, collectively, as first servers 141 and, generically, as a first server 141.

Similarly, the second client devices 102 generally communicate with the legacy system 112 via second servers 142-1, 142-2, including, but not limited to, a legacy global distribution (GDS) server 142-1 and a legacy provider entity server 142-2. The servers 142-1, 142-2 will be interchangeably referred to hereafter, collectively, as second servers 142 and, generically, as a second server 142.

In general, the first client devices 101, the servers 141, the OMS 111 and the first database 121 may, together, form a newer system to which entities associated with travel are transitioning, and components of the newer system may operate according to a first standard such as the NDC standard. Similarly, the second client devices 102, the servers 142, the legacy system 112 and the second database 122 may, together, form a legacy system from which entities associated with travel are transitioning, for example to the newer system, and components of the legacy system may operate according to a second standard that is newer than the first standard, such as GDS-based standards. In some examples, the legacy system 112 comprises a PSS.

As such, related data records for a product may be maintained at both the databases 121, 122 and may require synchronization; for example, an electronic airline ticket may be ordered via the OMS 111 via booking data received from one or more of the first client devices 101, and first data objects that conforms to a first standard, such as the NDC standard, may be stored at the first database 121; such first data objects are also referred to herein as "order data" as they pertain to "orders" for a product.

However, entities operating the second client devices 102 that have not yet transitioned to the newer (e.g. the NDC) standard may want to access data associated with the electronic airline ticket, and they may not be able to access the data objects at the first database 121 as the older system, of which they are a part, is generally not able to process such data objects. As such, second data objects that conforms to a second standard, such as the GDS-based standard, may be stored at the second database 122. The second data objects may include similar information as the first data objects but are stored in the second standard rather the first standard. For example, such second data objects may include, but are not limited one or more of a passenger name record and ticket data, that conform to the GDS-based standard, generated at the second database 122, such that that, for example, the second client devices 102 may also access data associated with the original booking data. Synchronization of the data objects at the databases 121, 122 can be problematic however, when a first client device 101 and a second client device 102 attempt to make changes to the booking data, for example in parallel with each other.

As depicted, the first client device 101-1 comprises a computing device and/or a terminal device operated, for example, by a travel agency, a provider entity, an airline, and/or another entity and/or provider entity, that may be associated with the travel industry, and which accesses the OMS 111 via a web server 141-1, for example to book and/or purchase a product. As depicted, the first client device 101-2 comprises a mobile device operated, for example, by user wishing to, for example, book and/or purchase a product via an associated application at the mobile device, and which accesses the OMS 111 via a mobile server 141-2. However, a user may alternatively use a web-based application to example to book and/or purchase a product, using a personal computer, a laptop, and the like, and the system 100 may include any suitable first servers 141 for providing access to the OMS 111 by users. Regardless, ordering of a product via a first client device 101 generally results in booking data transmitted to the OMS 111.

While only two first client devices 101 and two first servers 141 are depicted, the system 100 may comprises hundreds, thousands, and/or any suitable number of the first client devices 101 and the first servers 141. Further, while the first client devices 101 and first servers 141 are depicted in a one-to-one relationship, more than one first client device 101 may access the OMS 111 via a first server 141; for example, the web server 141-1 may act as a portal to the OMS 111 for hundreds, thousands, etc. of travel agencies and/or airlines and/or provider entity client devices 101-1, and the mobile server 141-2 may act as a portal to the OMS 111 for hundreds, thousands, etc. of mobile devices 101-2.

As depicted, the second client devices 102-1 comprises a computing device and/or a terminal device operated, for example, by a travel agency and/or another entity that may be associated with the travel industry, and which accesses the legacy system 112 via the legacy GDS server 142-1. As depicted, the second client device 102-2 comprises a computing device and/or a terminal device operated, for example, by an airline and/or a provider entity which accesses the legacy system 112 via a legacy airline and/or provider entity server 142-1. Regardless, ordering of a product via a second client device 102 generally results in booking data to be transmitted to the legacy system 112.

While only two second client devices 102 and two second servers 142 are depicted, the system 100 may comprises hundreds, thousands, and/or any suitable number of the second client devices 102 and the second servers 142. Further, while the second client devices 102 and second servers 142 are depicted in a one-to-one relationship, more than one second client device 102 may access the legacy system 112 via the second servers; for example, the legacy GDS server 142-1 may act as a portal to the legacy system 112 for hundreds, thousands, etc. of travel agency devices 102-1, and the legacy provider entity server 142-2 may act as a portal to the legacy system 112 for hundreds, thousands, etc. of airline devices 102-2.

The OMS 111 generally comprises one or more computing devices and/or servers operating according to a first standard including, but not limited to the NDC standard. The OMS 111 may receive booking data from a first client device 101 (e.g. via a first server 141) and responsively generate a data object, such as order data, at the first database 121, the data object defining a flight operated by a provider entity associated with the OMS 111 and the first database 121, such as an airline, and the like, and/or ancillary services associated with the flight, and/or another the data object may define another type of product and/or another type of travel product. Each data object therefore contains various fields. Certain fields define product attributes, such as product identifiers (e.g. service identifiers, item identifiers and the like), locations, dates and times corresponding to the products (e.g. flight times and other itinerary data). Other fields of the data object define client attributes, such as client identifiers (e.g. identifying the traveler, in the case of travel-related products such as the above-mentioned flights), payment data, and the like.

Hence, in general, the data objects are generated for storage in the first database 121 in response to booking data (which may also be referred to as orders, booking orders and/or purchase requests) received at the OMS 111 from other components of the system 100, such as the first client devices 101 as described above. For example, the booking data may be received from a first client device 101 which may be operated by a travel agent entity, and therefore generates and transmits booking data to purchase products to the OMS 111 on behalf of end users (e.g. travelers).

Various other mechanisms for initiating the creation of data objects and/or the order data at the first database 121 are also contemplated. For example, end users via the mobile client devices 101-2, and the like, may initiate the generation of data objects and/or the order data at the first database 121, via direct interaction with a website hosted by the mobile server 141-2, and the like and/or the OMS 111. Various other mechanisms for the generation of order data and/or data objects at the first database 121 will be apparent to those skilled in the art, such as the "offer" and "order" creation mechanisms specified by the NDC standard.

The legacy system 112 generally comprises one or more computing devices and/or servers operating according to a second standard including, but not limited to the Global Distribution System (GDS)-based standard. In general, the first standard by which the OMS 111 operates may be newer than the second standard by which the legacy system 112 operates. Generation of data objects such as passenger name records and/or ticket data at the second database 122 may proceed in a manner similar to the generation of data objects at the first database 121, but, for example, via interaction of the second client devices 102 with the legacy system 112, according to a GDS-based standard.

As also depicted in FIG. 1, the OMS 111 and the legacy system 112 are generally in communication via one or more communication links and/or one or more respective communication devices and/or one or more respective computing devices thereof. In particular, the OMS 111 and the legacy system 112 may be configured to communicate with each other to exchange data, for example when generating and/or synchronizing data objects at the databases 121, 122.

While particular database structures at the databases 121, 122 are described herein, the components of the databases 121, 122 may be stored according to any suitable structure and/or in any suitable manner including, but not limited to, storing data objects in one or more databases and/or one or more memories (e.g. that may or may not include databases and/or a database structure). For example, the second database 122 may comprise separate databases for respectively storing passenger name records and ticket data. Hence, for example, the databases 121, 122 are understood to be stored at one or more memories, for example at one or more devices, and/or the databases 121, 122 may be replaced by one or more memories. For example, the first database 121 may be stored at one or more computing devices and/or one or more memories of the OMS 111, and the second database 122 may be stored at one or more computing devices and/or one or more memories of the legacy system 112.

Figure 2:
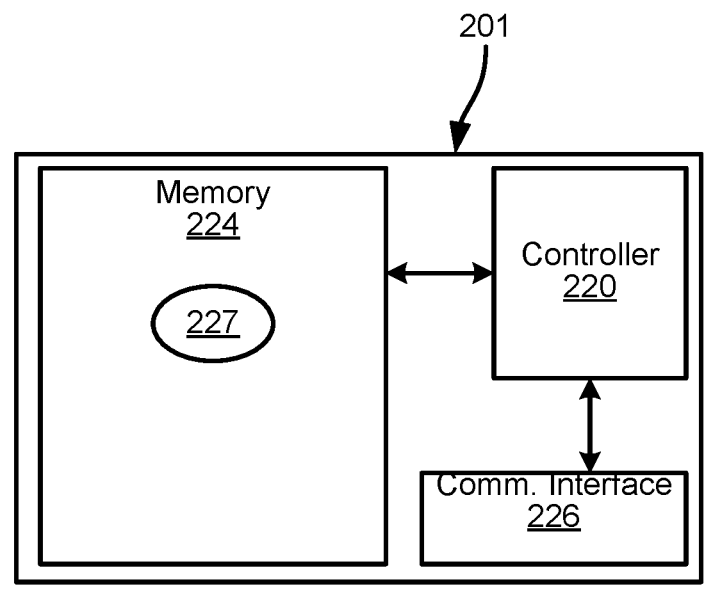
FIG. 2 depicts a device for mode-based synchronization of data records, according to non-limiting examples.

Turning to FIG. 2, before discussing the functionality of the system 100 in greater detail, certain components of a device 201 for mode-based synchronization of data records will be discussed in greater detail. The device 201 may comprise a computing device that is component of one or more of the OMS 111 and the legacy system 112, however the device 201 may be located elsewhere in the system 100 and may be used to synchronize data records at the databases 121, 122 according to a mode for particular booking data that caused particular data records to be generated at the databases 121, 122, for example based on the booking data being received from a first client device 101 or a second client device 102. In some examples, the device 201 may comprise an aggregator device which may be used by one or more of the systems 111, 112 to provide bookings of products and/or to synchronize data records at the databases 121, 122. Furthermore, the device 201 may comprise one or more computing devices and/or one or more cloud computing devices that may be geographically distributed; for example the device 201 may comprise a first device associated with the OMS 111 and second device associated with the legacy system 112.

As shown in FIG. 2, the device 201 includes at least one controller 220, such as one or more processors, central processing units (CPU), and the like. The controller 220 is interconnected with a memory 224, implemented as a suitable non-transitory computer-readable medium (e.g. a suitable combination of non-volatile and volatile memory subsystems including any one or more of Random Access Memory (RAM), read only memory (ROM), Electrically Erasable Programmable Read Only Memory (EEPROM), flash memory, magnetic computer storage, and the like). The controller 220 and the memory 224 are generally comprised of one or more integrated circuits (ICs).

The controller 220 is also interconnected with a communication interface 226, which enables the device 201 to communicate with the other components of the system 100 via one or more communication links and/or networks. The communication interface 226 therefore includes any necessary components (e.g. network interface controllers (NICs), radio units, and the like) to communicate with the other components of the system 100. The specific components of the communication interface 226 are selected based on upon the communication links and/or networks of the system 100. The device 201 can also include input and output devices connected to the controller 220, such as keyboards, mice, displays, and the like (not shown).

The components of the device 201 mentioned above can be deployed in a single enclosure, or in a distributed format, for example distributed geographically. In some examples, therefore, the device 201 includes a plurality of controllers, either sharing the memory 224 and communication interface 226, or each having distinct associated memories and communication interfaces.

In some examples, the memory 224 may store one or more of the databases 121, 122. The memory 224 stores a plurality of computer-readable programming instructions, executable by the controller 220, in the form of various applications, including an application 227 for mode-based synchronization of data records. As will be understood by those skilled in the art, the controller 220 executes the instructions of the application 227 (and any other suitable applications) in order to perform various actions defined by the instructions contained therein. In the description below, the controller 220, and more generally the device 201, may be configured to perform those actions. It will be understood that they are so configured via the execution (by the controller 220) of the instructions of the applications stored in memory 224.

Execution of the application 227 by the controller 220, configures the controller 220 and/or the device 201 to: receive, from one of a first client device 101 and a second client device 102, booking data; when the booking data is received from the first client device 101, in a first order mode for the booking data: cause the OMS 111 to generate: order data at the first database 121; and cause the legacy system 112 to generate a corresponding passenger name record at the second database 122, the corresponding passenger name record being slaved to the order data; and when the booking data is received from the second client device 102, in a legacy mode for the booking data: cause the legacy system to generate, one or more of a passenger name record and ticket data at the second database 122; and cause the OMS 111 to generate corresponding order data at the first database 121, the corresponding order data being slaved to the one or more of the passenger name record and the ticket data. Hence, synchronization of data objects at the databases 121, 122 associated with the booking data occur according to a mode for the booking data that depends on whether the booking data was received from a first client device 101 or a second client device 102, as described hereafter.

Figure 3:
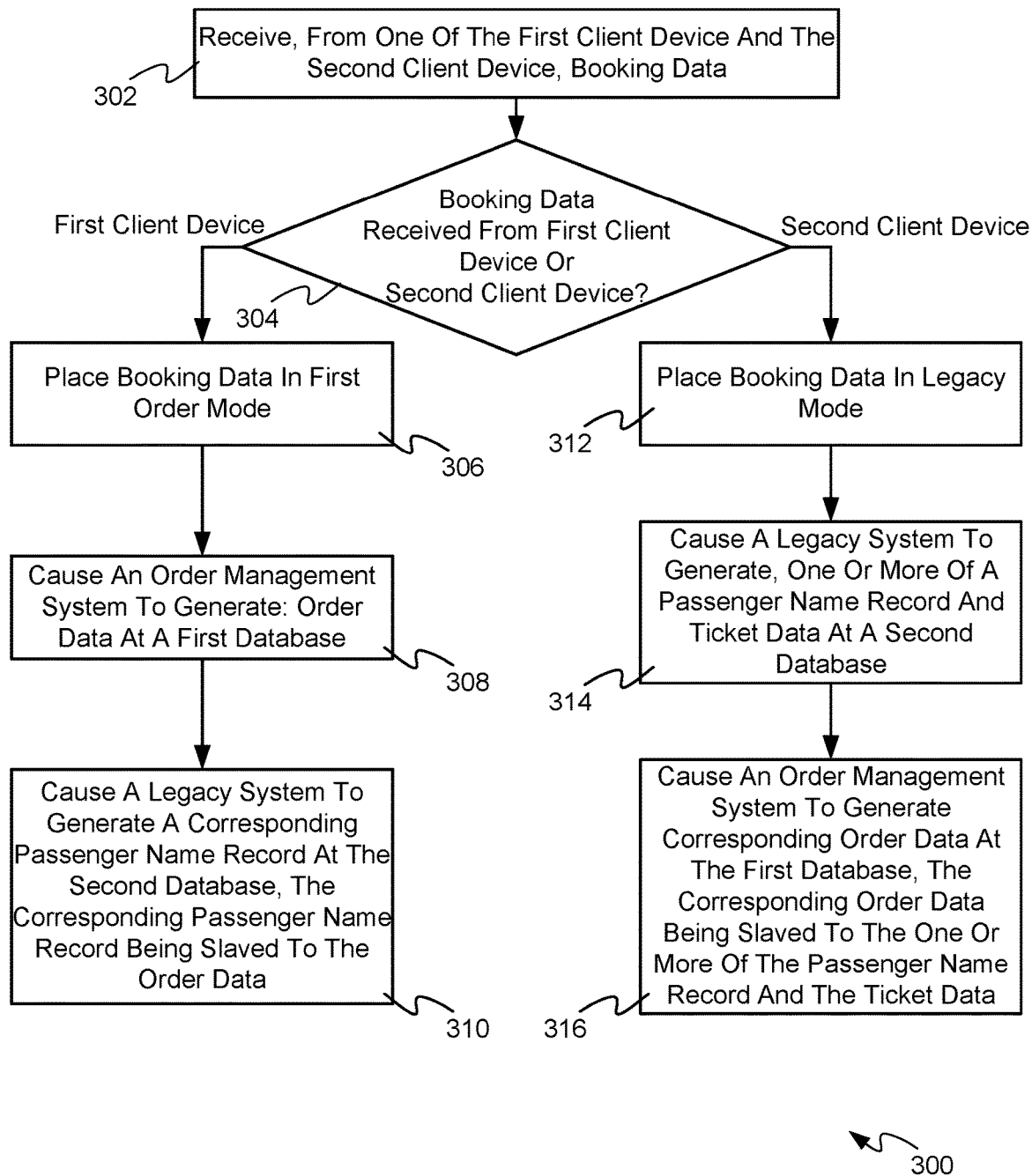
FIG. 3 depicts a method for mode-based synchronization of data records, according to non-limiting examples.

Attention is now directed to FIG. 3 which depicts a flowchart representative of a method 300 for mode-based synchronization of data records. The operations of the method 300 of FIG. 3 correspond to machine readable instructions that are executed by the device 201, and specifically the controller 220 of the device 201. In the illustrated example, the instructions represented by the blocks of FIG. 3 are stored at the memory 224 for example, as the application 227. The method 300 of FIG. 3 is one way in which the controller 220 and/or the device 201 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 220 and/or the device 201 receives, from one of a first client device 101 and a second client device 102, booking data. The booking data may comprise a request to purchase a product, such as an airline ticket, and the like, and/or any other suitable type of product.

At a block 304, the controller 220 and/or the device 201 determines whether the booking data is received from a first client device 101 or a second client device 102, for example on the basis of a network address, and the like, from where the booking data is received, such a network address of a first server 141 or a second server 142. The booking data may alternatively include data that identifies the booking data as having originated at a first client device 101 or a second client device 102, and/or which identifies the booking data as having originated at client devices operating according to a first and/or newer standard, such as the NDC standard, or a second and/or older standard, such as a GDS-based standard.

Alternatively, the controller 220 and/or the device 201 determines whether the booking data is received from a first client device 101 or a second client device 102 based on whether the booking data was received at the OMS 111 or the legacy system 112.

When the booking data is received from the first client device 101, at a block 306, the controller 220 and/or the device 201 may place the booking data into a first order mode for the booking data, for example by associating the booking data with an identifier of first order mode, such as an alphanumeric identifier and the like.

As used herein, the term "order mode" refers to a mode for the booking data where data objects associated with the booking data, stored at the first database 121, are masters to corresponding data objects associated with the booking data, stored at the second database 122. Hence, for example, the booking data may be placed in any of several "order modes" where associated order data is a master to corresponding data objects stored at the second database 122. Such different order modes are described in more detail below with respect to FIG. 8.

The booking data may be stored in the first database 121 in association with such an identifier and/or the booking data may be store in any suitable manner which indicates that the booking order is in a first order mode.

When the booking data is received from the first client device 101, at a block 308, the controller 220 and/or the device 201 causes the OMS 111 to generate: order data and/or a data object at the first database 121 which includes any suitable data associated with the booking data including, but not limited to, fields populated with product attributes and/or client attributes as described above, the fields populated according to the booking data. For example, the OMS 111 may generate such order data at the first database 121 and store the booking data and/or a booking data identifier in association with the order data and/or an identifier of the associated mode. The order data (and/or a data object) is stored at the first database 121 in a first format, for example the NDC format.

When the booking data is received from the first client device 101, at a block 310, the controller 220 and/or the device 201 causes the legacy system 112 to generate a corresponding passenger name record at the second database 122, the corresponding passenger name record being slaved to the order data. For example, the controller 220 and/or the device 201 may cause the OMS 111 to communicate with the legacy system 112 to cause the legacy system 112 to generate a passenger name record at the second database 122 that includes the same and/or similar data stored in the order data, for example in respective fields, but according to a second format (such as a GDS-based format, as described above), for example stored in association with the booking data and/or a booking identifier, as well as the identifier of the associated mode. Hence, in the first order mode, the first database 121 stores a data object (e.g. order data)) that is master to one corresponding data object (e.g. a passenger name record) stored at the second database 122.

In these examples, the OMS 111 may transmit data to the legacy system 112 indicative of the data stored in the order data at the first database 121, for example in the form of a command to generate a corresponding passenger name record slaved to the order data, which include an identifier of the associated mode to be stored in association with the corresponding passenger name record and/or the booking data and/or a booking identifier at the second database 122. Regardless, the order data and the corresponding passenger name record may be identified as being associated with each other via data stored in association therewith at the respective databases 121, 122 such that the synchronizations may occur therebetween.

For example, the identifier of the first order mode may generally indicate that the order data is a master data object and the corresponding passenger name record is a slave data object; hence, when synchronization of the databases 121, 122 occurs, the corresponding passenger name record is updated according to the order data, and the order data is not updated according to the corresponding passenger name record. Hence, the synchronization in the first order mode for the booking data is a one-way synchronization from the master data object at the first database 121 to the slave data object at the second database 122.

However, either a first client device 101 or a second client device 102 may attempt to access and make changes to the booking data.

In some examples, the method 300 may further include the controller 220 and/or the device 201, in the first order mode for the booking data: receiving, from a first client device 101, booking change data; causing the order data to be changed at the first database 121 according to the booking change data; and causing the corresponding passenger name record to be changed at the second database 122 according to changes made to the order data at the first database 121. For example, when a first client device 101 attempts to change the booking data in the first order mode, the controller 220 and/or the device 201 may receive booking change data and update the order data accordingly, for example using the OMS 111. However, the corresponding passenger name record may not be updated using the legacy system 112; rather the corresponding passenger name record is updated when the databases 121, 122 are synchronized and the corresponding passenger name record, slaved to the order data, is updated during the synchronization according to the changes made to the order data.

Furthermore, when a second client device 102 attempts to access and make changes to the booking data, for example by transmitting, to the legacy system 112, booking change data, the legacy system 112 may redirect such booking change data to the OMS 111, such that the OMS 111 updates the order data according to the booking change data, and changes to the order data occur at the corresponding passenger name record when a synchronization of the databases 121, 122 occur.

Put another way, the method 300 may further include the controller 220 and/or the device 201, in the first order mode for the booking data, redirecting changes to the corresponding passenger name record at the second database 122, by the second client device 102, to the order data at the first database 121; and causing synchronization of the corresponding passenger name record at the second database 122 with the order data at the first database 121, for example by causing a synchronization of the databases 121, 122.

Put yet another way, the method 300 may further include the controller 220 and/or the device 201, in the first order mode for the booking data: receiving, from the second client device 102, booking change data; preventing a change to the corresponding passenger name record at the second database 122 based on the booking change data; causing the order data to be changed at the first database 121 according to the booking change data; and causing the corresponding passenger name record to be changed at the second database 122 according to changes made to the order data at the first database 121.

One exception to this example may be the legacy system 112 updating the corresponding passenger name record at the second database 122 when the booking change data includes changes to the corresponding passenger name record that will not otherwise impact the order data; for example, the booking change data may include addition of a product and/or a service for which no corresponding field exists in the order data, but for which a corresponding field exists in the corresponding passenger name record. One example is a remark field in the corresponding passenger name record that indicates a "VIP PASSENGER" for which there is no corresponding field in the order data. In these example, the legacy system 112 may update the corresponding passenger name record according to the booking change data.

Returning to the block 304, when the booking data is received from the second client device 102, at a block 312, the controller 220 and/or the device 201 may place the booking data into a legacy mode for the booking data, for example by associating the booking data with an identifier of a legacy mode, such as an alphanumeric identifier and the like. The booking data may be stored in the second database 122 in association with such an identifier and/or the booking data may be stored in any suitable manner which indicates that the booking order is in a legacy mode.

When the booking data is received from the second client device 102, at a block 314, the controller 220 and/or the device 201 causes the legacy system 112 to generate, one or more of a passenger name record and ticket data (and/or a data object and/or data objects) at the second database 122. Similar to the order data, the one or more of a passenger name record and ticket data include fields populated with product attributes and/or client attributes, as described above, according to the booking data. Whether a passenger name record and/or ticket data are generated may depend on the data received with the booking data. The passenger name record and/or the ticket data includes any suitable data associated with the booking data including, but not limited to, fields populated with product attributes and/or client attributes as described above, the fields populated according to the booking data. For example, the legacy system 112 may generate a passenger name record and/or the ticket data at the second database 122 and store the booking data and/or a booking data identifier in association with the passenger name record and/or the ticket data and an identifier of the associated mode. The passenger name record and/or the ticket data (and/or a data object and/or data objects) are stored at the second database 122 in a second format, for example a GDS-based format.

When the booking data is received from the second client device 102, at a block 316, the controller 220 and/or the device 201 causes the OMS 111 to generate corresponding order data at the first database 121, the corresponding order data being slaved to the one or more of the passenger name record and the ticket data. For example, the controller 220 and/or the device 201 may cause the legacy system 112 to communicate with the OMS system 111 to cause the OMS system 111 to generate corresponding order data at the first database 121 that includes the same and/or similar data stored in the one or more of the passenger name record and the ticket data, for example in respective fields, but according to the first format (such the NDC format, as described above), for example stored in association with the booking data and/or a booking identifier, as well as the identifier of the associated mode. In these examples, the legacy system 112 may transmit data to the OMS 111 indicative of the data stored in the one or more of the passenger name record and the ticket data at the second database 122, for example in form of a command to generate corresponding order data slaved to the one or more of the passenger name record and the ticket data, which may be indicated by the identifier of the associated mode stored in association with the corresponding order data and/or the booking data. Hence, in the legacy mode, the second database 122 stores one or more data objects (e.g. a passenger name record and/or ticket data) that are master to a corresponding data object (e.g. order data) stored at the first database 121.

Regardless, the one or more of the passenger name record and the ticket data and the corresponding order data may be identified as being associated with each other via data stored in association therewith at the respective databases 121, 122 such that the synchronizations may occur therebetween.

For example, the identifier of the legacy mode may generally indicate that the one or more of the passenger name record and the ticket data are master data objects and the corresponding order data is a slave data object; hence, when synchronization of the databases 121, 122 occur, the corresponding order data is updated according to the one or more of the passenger name record and the ticket data, and the one or more of the passenger name record and the ticket data is not updated according to the corresponding order data. Hence, the synchronization in the legacy mode for the booking data is a one-way synchronization from one or more master data objects at the second database 122 to the slave data object at the first database 121.

Furthermore, when a first client device 101 attempts to access and make changes to the booking data, for example by transmitting, to the OMS system 111, booking change data, the OMS system 111 will redirect such booking change data to the legacy system 112, such that the legacy system 112 updates the one or more of the passenger name record and the ticket data according to the booking change data, and changes to the passenger name record and the ticket data occur at the corresponding order data when a synchronization occurs, as described in more detail below.

One exception to this example may be the OMS system 111 updating the corresponding order data at the first database 121 when the booking change data includes changes to the corresponding order data that will not otherwise impact the one or more of the passenger name record and the ticket data; for example, the booking change data may include addition of a product and/or a service for which no corresponding field exists in the one or more of the passenger name record and the ticket data, but for which a corresponding field exists in the corresponding order data. One example is a that, under the NDC standard, order data may include portions of itinerary types that are not supported by GDS-based standards, such as train rides; hence, for example, corresponding order data may be updated by a first client device 101 to include a field that indicates a train ride, while no corresponding field for train ride may exist in the passenger name record and/or the ticket data. In these example, the OMS 111 may update the corresponding order data according to the booking change data, for example that indicates a train ride.

Put another way, the method 300 may further include the controller 220 and/or the device 201, in the legacy mode for the booking data: redirecting changes to the corresponding order data at the first database 121 by the first client device

101 to the passenger name record at the second database 122; and causing synchronization of the corresponding order data at the first database 121 with the passenger name record at the second database 122.

Put yet another way, the method 300 may further include the controller 220 and/or the device 201, in the legacy mode for the booking data: receiving, from the first client device 101, booking change data; preventing a change to the corresponding order data at the first database 121 based on the booking change data; causing one or more of the passenger name record and the ticket data to be changed at the second database 122 according to the booking change data; and causing the corresponding order data to be changed at the first database 121 according to changes made to the one or more of the passenger name record and the ticket data at the second database 122.

In yet further examples, when the booking data is received from the first client device 101, the booking data may be placed in a second order mode, in which corresponding ticket data for the order data is generated in addition to the corresponding passenger name record. Hence, in the second order mode, the first database 121 stores a data object (e.g. order data)) that is master to two or more corresponding data objects (e.g. one or more a passenger name records and ticket data) stored at the second database 122.

For example, the method 300 may further include the controller 220 and/or the device 201: when the booking data is received from the first client device 101, in a second order mode for the booking data, causing the legacy system 112 to generate: corresponding ticket data at the second database 122, the corresponding ticket data also being slaved to the order data. Hence, similar to the corresponding passenger name record, changes to the corresponding ticket data occur via the order data being changed, and the databases 121, 122 being synchronized. Hence, for example, the block 306 may alternatively include placing the booking data into the second order mode, which is similar to the first order mode, except that corresponding ticket data is also generated at the second database 122. Whether the booking data is placed in the first order mode or the second order mode may depend on information in the booking data and/or whether the legacy system 112 is operating in a respective mode that requires corresponding ticket data.

Other types of modes are within the scope of the present specification. For example, an order mode and/or a legacy for booking data may include generation of an electronic miscellaneous document (EMD) at the second data base 122.

Furthermore, in some examples, a mode of the booking data may be switched. For example, booking change data received from a first client device 101 or a second client device 102 may cause the booking data to change from the first order mode to the second order mode, for example, when the booking change data is related to generation of an airline ticket, and the legacy system 112 is to responsively have access to corresponding ticket data.

In yet further examples, the booking data may change from the first order mode (or the second order mode) to the legacy mode, for example, the method 300 may further include the controller 220 and/or the device 201, in the first order mode (or the second order mode) for the booking data: receiving a request to switch from the first order mode to the legacy mode; causing the legacy system 112 to generate corresponding ticket data at the second database 122 (e.g. at least temporarily placing the booking data in the second order mode), the corresponding ticket data also being slaved to the order data; and changing the corresponding passenger name record and the corresponding ticket data from being slaved to the order data to being a master to the order data, such that the order data at the first database 121 is slaved to the corresponding passenger name record and the corresponding ticket data at the second database 122.

Such a situation may occur by an operator of a first client device 101 or a second client device 102 deciding that the mode of the booking order is to change from the first order mode to the legacy mode, and controlling a first client device 101 or a second client device 102 to transmit the request to switch. For example, the booking data may originally be generated by a first client device 101, for example of a first airline entity whose systems operate according to the NDC format, but the booking data may be for a second airline entity whose systems operate according to a legacy GDS-based format; in this instance a user may decide that, as the booking data is more likely to be managed via second client devices 102, the mode of the booking data should be switched to the legacy mode, and the request is transmitted accordingly.

However, such a request may be transmitted automatically by a client device 101, 102, and/or the legacy system 112, when a client device 101, 102 and/or the legacy system 112 determines that master order data at the first database 121 has been generated for a ticket to be provided by the provider entity (e.g. an airline entity) operating the legacy system 112, and the like.

In some examples, the mode of the booking order may be changed from the first order mode or the second order mode to the legacy mode when received booking change data is not supported by the OMS 111, for example when the booking change data generated by a second client device 102 includes a change that the OMS 111 cannot implement. In these examples, the method 300 may further include the controller 220 and/or the device 201, in the first order mode for the booking data: receiving, from a second client device 102, booking change data that is not supported by the OMS 111; switching from the first order mode to the legacy mode by: causing the legacy system 112 to generate corresponding ticket data at the second database 122, the corresponding ticket data also being slaved to the order data (e.g. at least temporarily placing the booking data in the second order mode); and changing the corresponding passenger name record and the corresponding ticket data from being slaved to the order data to being a master to the order data, such that the order data at the first database 121 is slaved to the corresponding passenger name record and the corresponding ticket data at the second database 122; causing the legacy system 112 to change one or more of the corresponding passenger name record and the corresponding ticket data, at the second database 122 according to the booking change data; and causing the order data to be changed, at the first database, 121 according to changes to one or more of the corresponding passenger name record and the corresponding ticket data at the second database 122.

Examples of the method 300 are next described.

Figure 4:
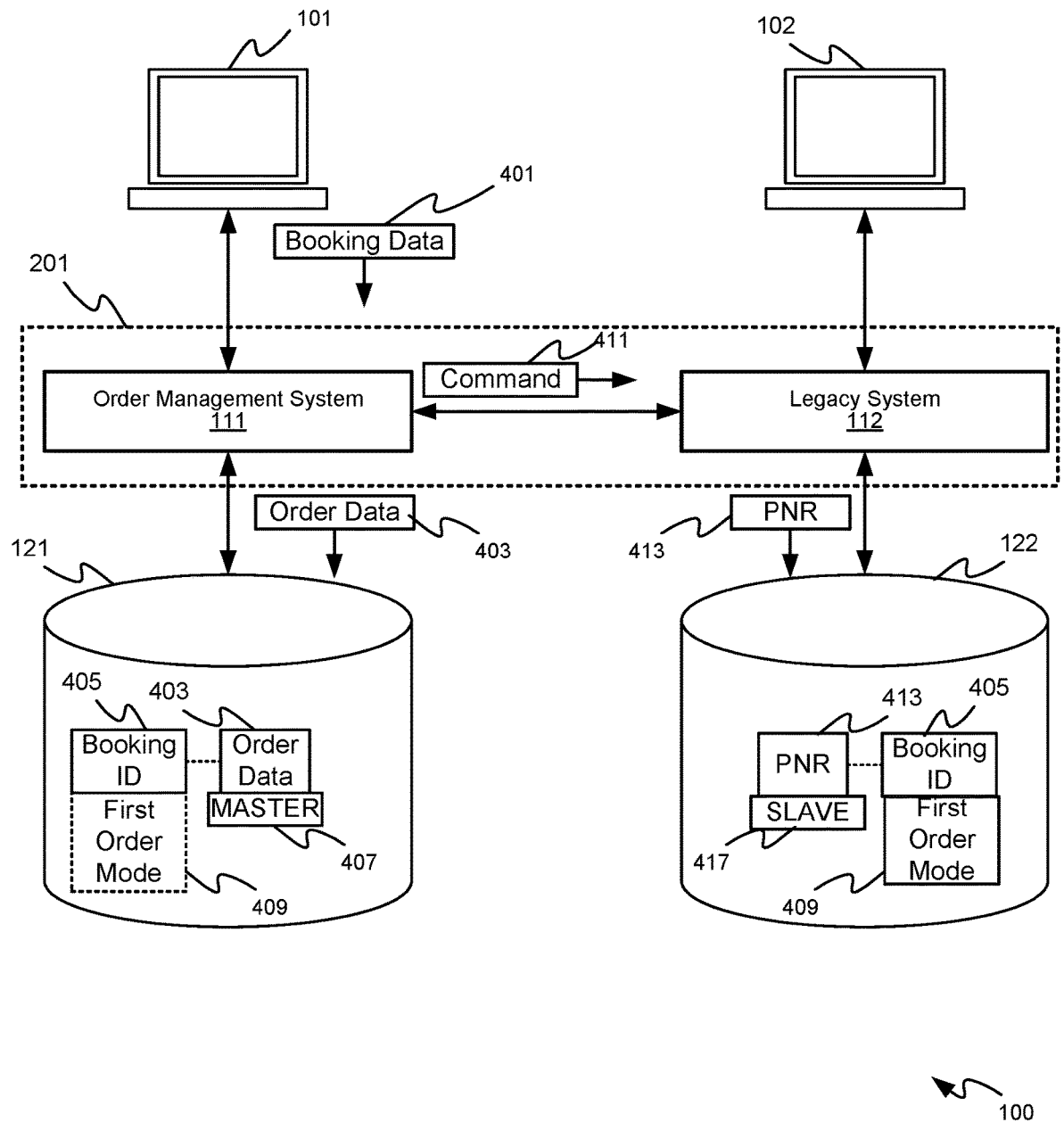
FIG. 4 depicts the system of FIG. 1 in a first order mode for booking data, according to non-limiting examples.

Attention is next directed to FIG. 4 which depicts a simplified version of the system 100; however, while only one of each of the client devices 101, 102 are depicted, and the servers 141, 142 are not depicted, it is understood that components of the system 100 not depicted in FIG. 4 may nonetheless be present. Furthermore, FIG. 4 further depicts, in dashed lines, that the device 201 may be a component of one or more of the OMS 111 and the legacy system 112.

In particular, FIG. 4 depicts examples of the blocks 302, 304, 306, 308, 310 of the method 300. For example, in FIG. 4, the depicted first client device 101 generates booking data 401 and transmits the booking data 401 to the device 201 and/or the OMS 111, which receives the booking data 401 at the block 302. As the booking data 401 is received from the first client device 101, the booking data 401 is placed into the first order mode at the block 306, and order data 403 is generated by the device 201 and/or the OMS 111 and stored at the first database 121, for example at the block 308. As depicted, the order data 403 is stored in association with a booking identifier 405 which identifies the booking data 401; associations between components of the databases 121, 122 are depicted herein via dashed lines therebetween.

As the order data 403, in the first order mode for the booking data 401, comprises a master data object and/or is a master to corresponding data stored at the second database 122, the order data 403 is depicted as being stored with a master identifier 407, identifying the order data 403 as being a master to corresponding data stored at the second database 122. Alternatively, the booking identifier 405 may be stored with an identifier 409 identifying the booking order 401 as being in the first order mode. However, either of the identifiers 407, 409 may be optional, and the booking data 401 being in the first order mode and/or the order data 403 being a master to corresponding data stored at the second database 122 may be indicated in any suitable manner.

To cause the legacy system 112 to generate a corresponding passenger name record at the second database 122, the device 201 and/or the OMS 111 transmits (e.g. at the block 310) a command 411 to the legacy system 112 which may include data from the booking data 401 and/or the order data 403 to be included in a corresponding passenger name record. The legacy system 112 (and/or the device 201) responsively generates a corresponding passenger name record (PNR) 413 (and/or or one or more PNRs) and stores the corresponding PNR 413 at the second database 122, for example in association with the booking identifier 405 (e.g. transmitted with the command 411). While an example is described with respect to one corresponding PNR 413, in other examples, the legacy system 112 may generate more than one PNRs.

As the corresponding PNR 413 in the first order mode for the booking data 401 comprises a slave data object and/or is a slave to the order data 403 (e.g. a master data object) stored at the first database 121, the corresponding PNR 413 is depicted as being stored with a slave identifier 417, identifying the corresponding PNR 413 as being a slave to the order data 403 stored at the first database 121. Alternatively, the booking identifier 405 may be stored with the identifier 409 identifying the booking order 401 as being in the first order mode. However, either of the identifiers 417, 409 may be optional, and the booking data 401 being in the first order mode and/or the corresponding PNR 413 being a slave to the order data 403 stored at the first database 121 may be indicated in any suitable manner.

Hence, the booking data 401 being in the first order mode may be defined via identifiers stored in the databases 121, 122 which indicate the first order mode and/or via identifiers of the order data 403 and/or the corresponding PNR 413 which indicate that the corresponding PNR 413 is slaved to the order data 403. The order data 403 and the corresponding PNR 413 may be synchronized accordingly and/or updates to the order data 403 and the corresponding PNR 413 may occur accordingly.

Figure 5:
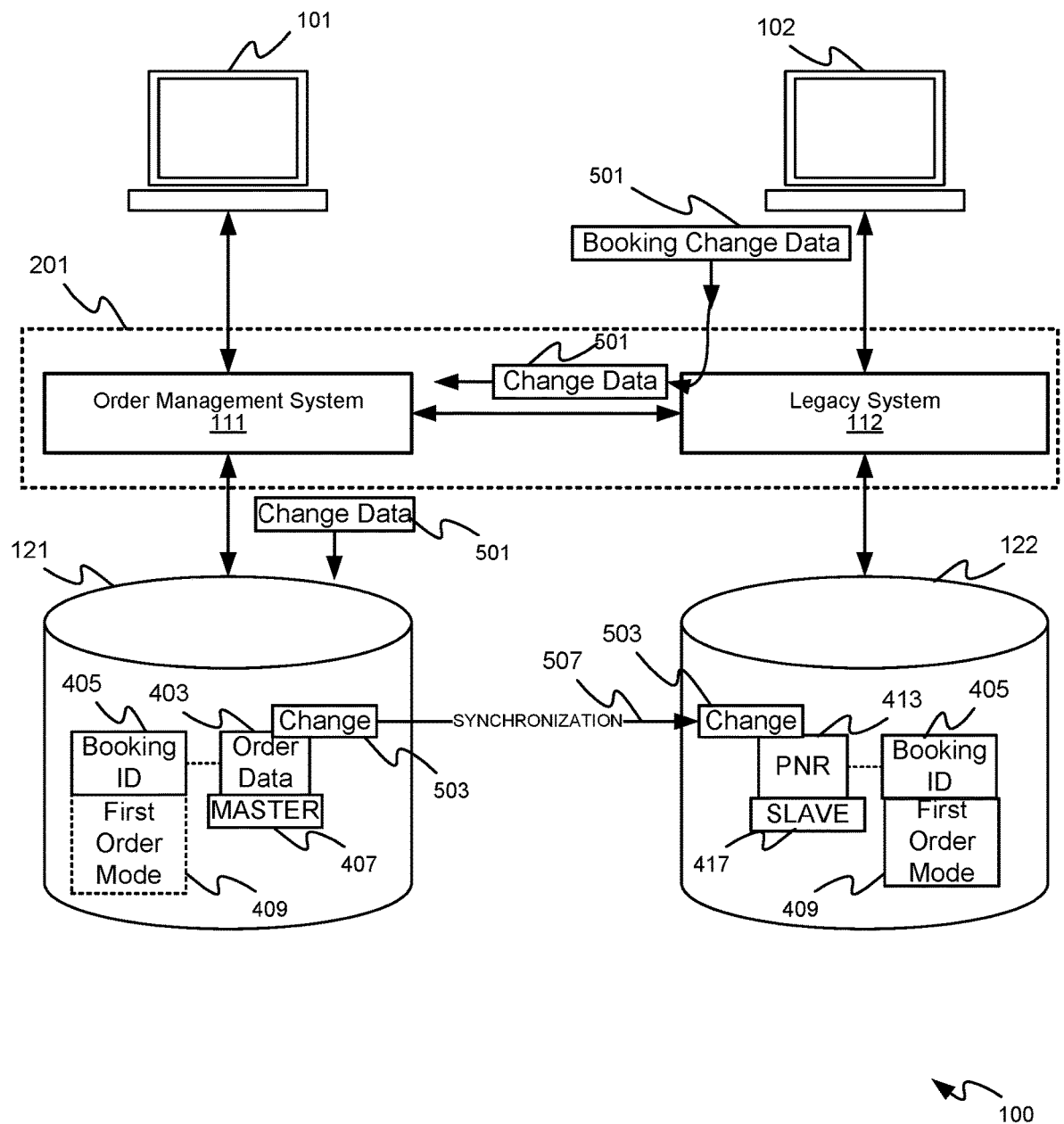
FIG. 5 depicts the system of FIG. 1 in the first order mode for booking data, un which booking change data is received, according to non-limiting examples.

For example, attention is next directed to FIG. 5 which is substantially similar to FIG. 4 with like components having like numbers. In FIG. 5, the system 100 is in a state similar to that depicted in FIG. 4, however the second client device 102 is attempting to make a change to the booking data 401 and/or the corresponding PNR 413, for example by transmitting booking change data 501 to the legacy system 112 and/or the device 201. The booking change data 501 may include a requested change to the booking data 401 and/or the corresponding PNR 413 which may be identified using the booking identifier 405. However, the legacy system 112 and/or the device 201 determines that the booking data 401 associated with the booking identifier 405 is in the first order mode and prevents changes to the corresponding PNR 413 from occurring by redirecting the booking change data 501 to the OMS 111. In response to receiving the booking change data 501, the OMS 111 and/or the device 201 changes the order data 403 to include a change 503 thereof, for example by using the booking change data 501 to update the order data 403. The change 503 to the order data 403 is propagated to the corresponding PNR 413 during a synchronization 507 of the databases 121, 122 and/or (as depicted) a one-way synchronization of the order data 403 to the PNR 413.

A master/slave relationship between data objects in the databases 121, 122 may not be indicated at a "top-record level" (e.g. via master/slave identifiers as depicted in FIG. 4); master/slave relationship between data objects in the databases 121, 122 may be set as database conditions on parts of the data objects. For example, with reference to FIG. 4, even when the order data 403 is a master to the PNR 413, a portion of the PNR 403 may be updated with booking change data that doesn't conflict with data of the order data 403. For example, a remark, such as "VIP PASSENGER", may be added to a field of the PNR 403 that does not conflict with the order data 403.

Figure 6:
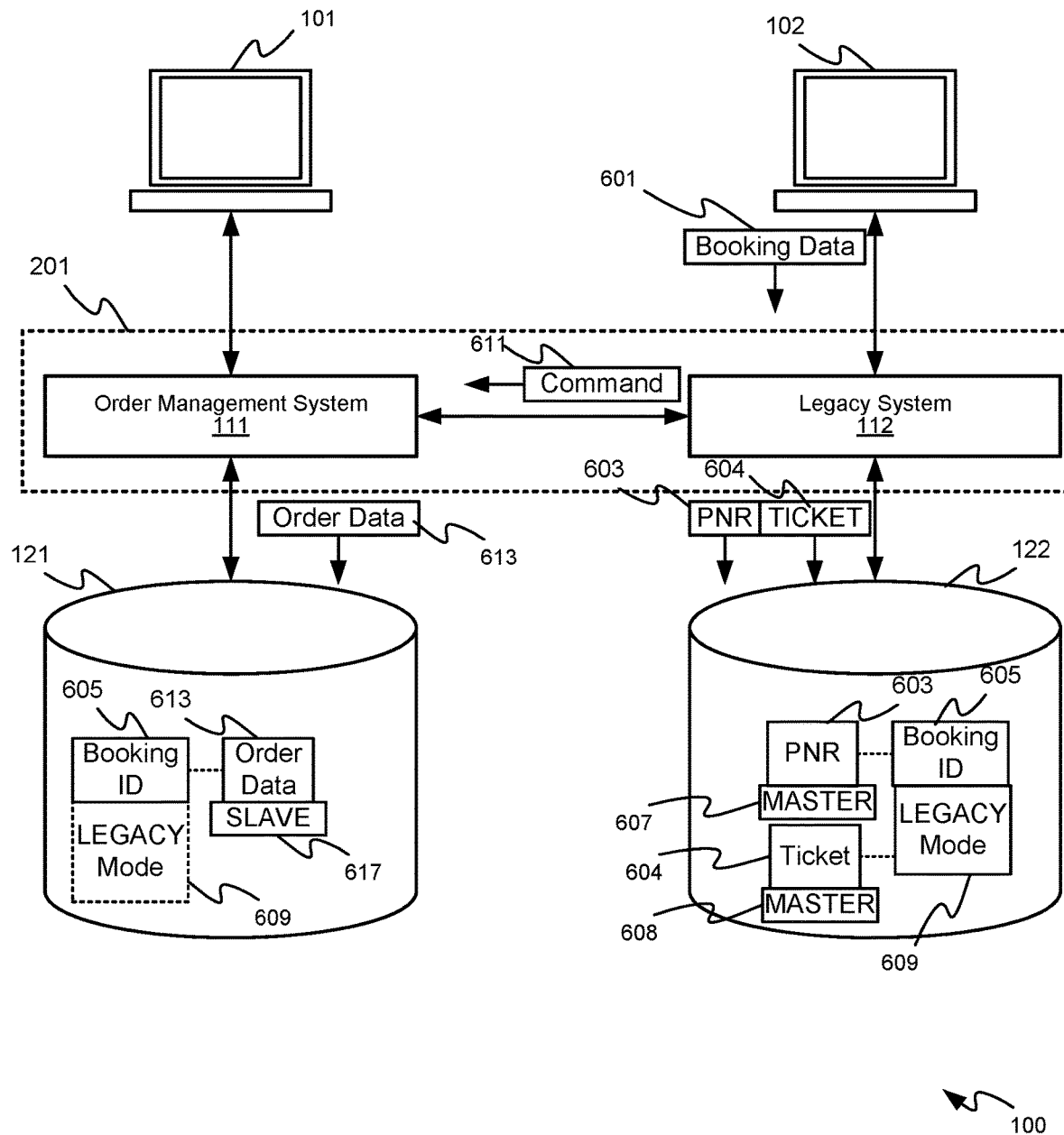
FIG. 6 depicts the system of FIG. 1 in a legacy mode for booking data, according to non-limiting examples.

Attention is next directed to FIG. 6 which is substantially similar to FIG. 4 with like components having like numbers. In particular, FIG. 6 depicts examples of the blocks 302, 304, 312, 314, 316 of the method 300. For example, in FIG. 6, the depicted second client device 102 generates booking data 601 and transmits the booking data 601 to the device 201 and/or the legacy system 112, which receives the booking data 601 at the block 302. As the booking data 601 is received from the second client device 102, the booking data 601 is placed into the legacy mode at the block 306, and a passenger name record (PNR) 603 and ticket data 604 is generated by the device 201 and/or the legacy system 112 and stored at the second database 122, for example at the block 314. As depicted, the PNR 603 and the ticket data 604 are stored in association with a booking identifier 605 which identifies the booking data 601.

As the PNR 603 and the ticket data 604 in the legacy mode for the booking data 601 comprise master data objects and/or are masters to corresponding data stored at the first database 121, the PNR 603 and the ticket data 604 are depicted as being stored with respective master identifiers 607, 608 identifying the PNR 603 and the ticket data 604 as being masters to corresponding data stored at the first database 121. Alternatively, the booking identifier 605 may be stored with an identifier 609 identifying the booking data 601 as being in the legacy mode. However, any of the identifiers 607, 608, 609 may be optional, and the booking data 601 being in the legacy mode and/or the PNR 603 and the ticket data 604 being masters to corresponding data stored at the first database 121 may be indicated in any suitable manner.

To cause the OMS 111 to generate corresponding order data at the first database 121, the device 201 and/or the legacy system 112 transmits (e.g. at the block 316) a command 611 to the OMS 111 which may include data from the booking data 601 and/or the PNR 603 and/or the ticket data 604 to be included in corresponding order data. The OMS 111 (and/or the device 201) responsively generates corresponding order data 613 and stores the corresponding order data 613 at the first database 121, for example in association with the booking identifier 605 (e.g. transmitted with the command 611).

Hence, the booking data 601 being in the legacy mode may be defined via identifiers stored in the databases 121, 122 which indicate the legacy mode and/or via identifiers of the PNR 603 and the ticket data 604 and/or the corresponding order data 613 which indicate that the corresponding order data 613 is slaved to the PNR 603 and the ticket data 604. The PNR 603 and the ticket data 604 and the corresponding order data 613 may be synchronized accordingly and/or updates to the PNR 603 and the ticket data 604 and the corresponding order data 613 may occur accordingly.

Figure 7:
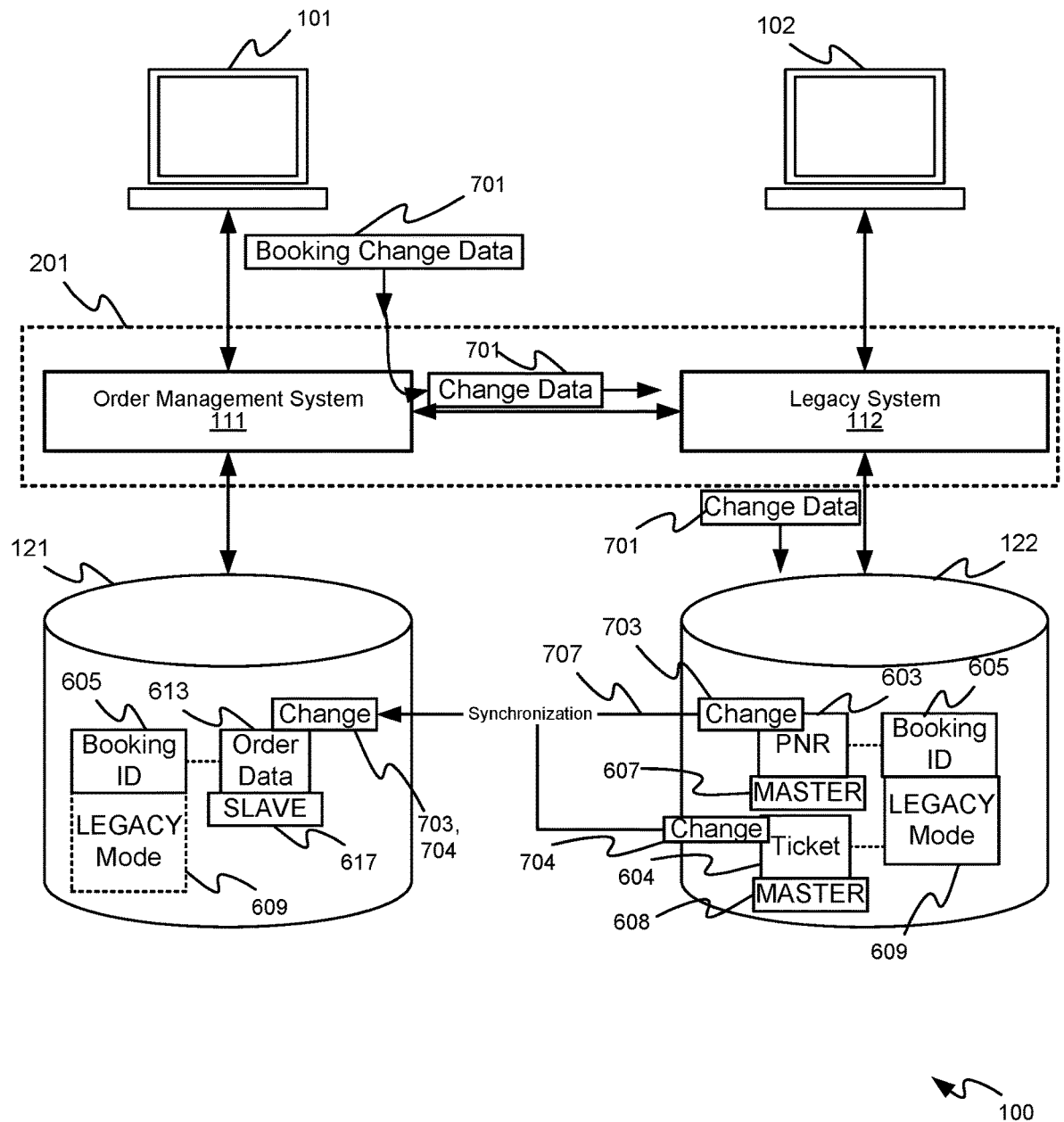
FIG. 7 depicts the system of FIG. 1 in the legacy mode for booking data, un which booking change data is received, according to non-limiting examples.

For example, attention is next directed to FIG. 7 which is substantially similar to FIG. 6 with like components having like numbers. In FIG. 7, the system 100 is in a state similar to that depicted in FIG. 6, however the first client device 101 is attempting to make a change to the booking data 601 and/or the corresponding order data 613, for example by transmitting booking change data 701 to the OMS 111 and/or the device 201. The booking change data 701 may include a requested change to the booking data 601 and/or the corresponding order data 613 which may be identified using the booking identifier 605. However, the OMS 111 and/or the device 201 determines that the booking data 601 associated with the booking identifier 605 is in the legacy mode and prevents changes to the corresponding order data 613 from occurring by redirecting the booking change data 701 to the legacy system 112. In response to receiving the booking change data 701, the legacy system 112 and/or the device 201 changes the PNR 603 to include a change 703, and/or changes the ticket data 604 to include a change 704, for example by using the booking change data 701 to update the PNR 603 and/or the ticket data 604. The changes 703, 704 to the PNR 603 and/or the ticket data 604 are propagated to the corresponding order data 613 during a synchronization 707 of the databases 121, 122 and/or (as depicted) a one-way synchronization of the PNR 603 and/or the ticket data 604 to the order data 613.

While the examples depicted in FIG. 4 and FIG. 5, and FIG. 6 and FIG. 7 are depicted separately, it is understood that the depicted examples may occur concurrently, such that some booking data is in a first order mode (and/or another order mode), while other booking data is in a legacy mode. Indeed, the system 100 may include thousands, hundreds of thousands, millions, etc. of booking orders, and each may be in an associated order mode or an associated legacy mode.

As the corresponding order data 613 in the legacy mode for the booking data 601 comprises a slave data object and/or is a slave to the PNR 603 and the ticket data 604 (e.g. master data objects) stored at the second database 122, the corresponding order data 613 is depicted as being stored with a slave identifier 617, identifying the corresponding order data 613 as being a slave to the PNR 603 and the ticket data 604 stored at the second database 122. Alternatively, the booking identifier 605 may be stored with the identifier 609 identifying the booking data 601 as being in the legacy mode. However, either of the identifiers 617, 609 may be optional, and the booking data 601 being in the legacy mode and/or the corresponding order data 613 being a slave to the PNR 603 and the ticket data 604 stored at the second database 122 may be indicated in any suitable manner.

For example, as described above, a master/slave relationship between data objects in the databases 121, 122 may not be indicated at a "top-record level" (e.g. via master/slave identifiers as depicted in FIG. 6); master/slave relationship between data objects in the databases 121, 122 may be set as database conditions on parts of the data objects. Hence, in another example, with reference to FIG. 6, the order data 613 may store data related to different portions of an itinerary of a passenger, for example with a first portion being a flight and a second portion being a train ride (e.g. which is a capability of the NDC standard), while the PNR 413 may store data related to the flight and not the train ride; indeed, in these examples, the order data 613 may be updated via a first client device 101 to include the train ride. Hence, even when the PNR 603 is a master for the flight portion, the train ride portion in the order data 603 only may be considered as a master. While a present example is described with respect to a train ride, the second portion may be for any other suitable type of non-airline product, including, but not limited to bus rides, hotel reservations, and the like. In some examples the second portion may be stored in the first database 121 as a "travel order" and/or as a "reservation object", for example as a component of the order data 613. The legacy system 112 may be incapable of handling such types of non-airline products.

Figure 8:
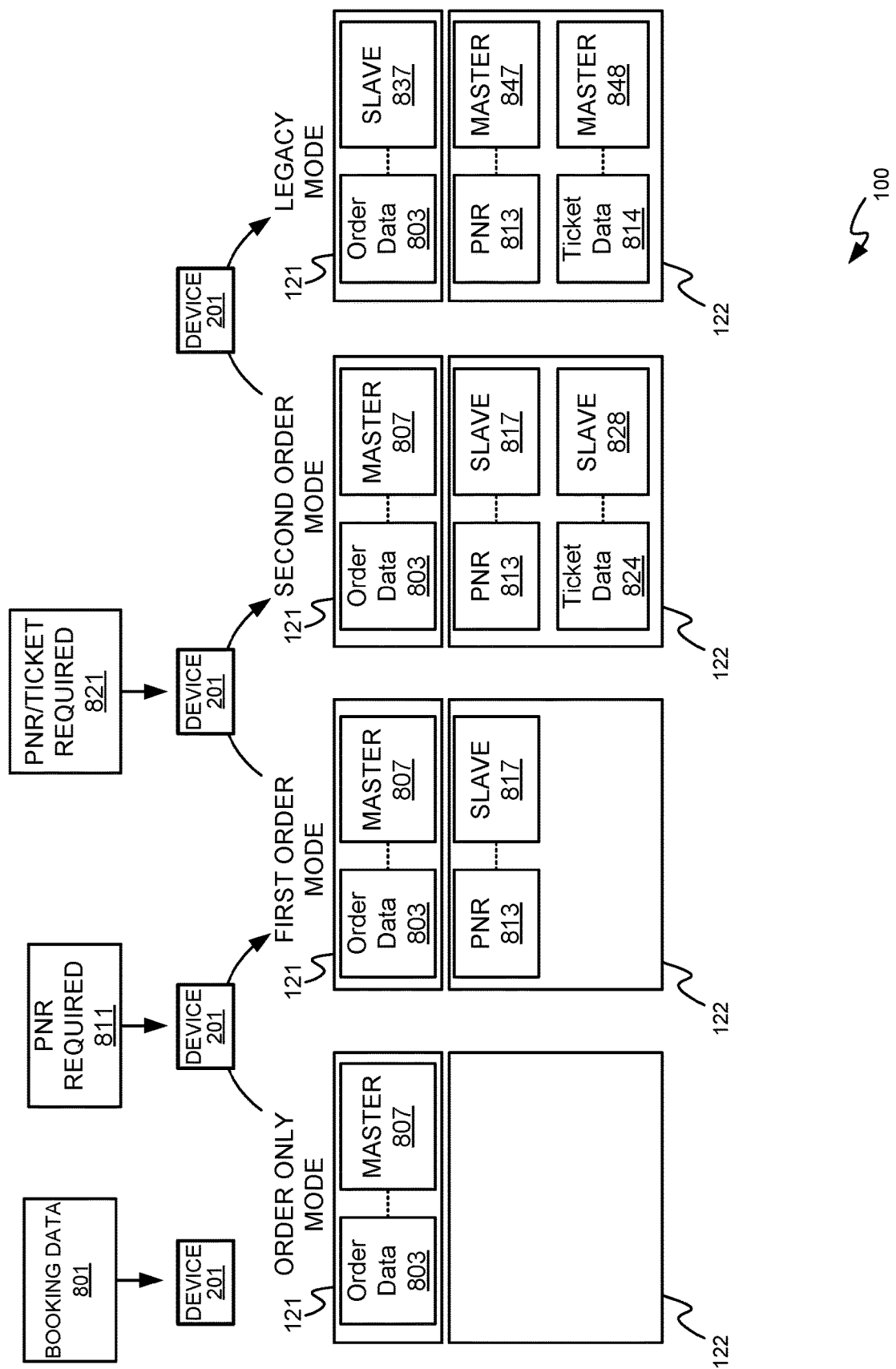
FIG. 8 depicts mode switching for booking data in the system of FIG. 1, according to non-limiting examples.

Attention is next directed to FIG. 8 which depicts simplified versions of the system 100 in different modes for booking data 801, and depicts only the device 201 (which may be located at one or more of the OMS 111 and the legacy system 112) and the databases 121, 122; however, it is understood that components of the system 100 not depicted in FIG. 8 may nonetheless be present. In particular, FIG. 8 depicts the system 100 implementing mode switching for the booking data 801, for example, when a request to switch modes is received at the device 201 and/or when various other conditions occur in the system 100, such as (as depicted) receiving booking change data that results in mode switching. Furthermore, while specific examples are described with respect to FIG. 8, other examples of mode switching are within the scope of the present specification. In particular, FIG. 8.

Furthermore, while the device 201 and the databases 121, 122 are depicted more than once in FIG. 8, it is understood FIG. 8 depicts the device 201 performing technical operations on data objects of the databases 121, 122 to switch modes in the system 100 (e.g., via the OMS 111 and/or the legacy system 112).

As depicted, the device 201 (and/or the OMS 111) may initially receive the booking data 801 (e.g. from a first client device 101), and may initially generated order data 803 at the first database 121, but not corresponding PNR nor corresponding ticket data at the second database 122. For example, such a state of the booking data 801 is labelled in FIG. 8 as an "ORDER ONLY MODE". Such an order only mode of the booking data 801 represents a state for booking orders to which provider entities may be transitioning, such that provider entities operate according to the NDC standard, without also implementing a GDS-based standard.

However, the order only mode may occur for the booking data 801 in the system 100 when the booking data 801 is first received at device 201 and/or the OMS 111 from a first client device 101, and before communication with the legacy system 112 occurs. Hence, for example, the order data 803 is stored with an indicator 807 indicating that the order data 803 is to be a master to any corresponding data later generated at the second database 122. In the present example, it is assumed that the database 121 is associated with a provider entity, such as a first airline, that has transitioned to the NDC standard, and that the order data 803 represents a flight ticket on the first airline.

As depicted, in the order only mode for the booking data 801, the device 201 receives booking change data 811 for the booking data 801 that requires a PNR 813 to be generated at the second database 122. For example, such booking change data 811 may indicate a flight change to a partner provider entity associated with the second database 122 (e.g. a second airline that is partner to the first airline); however, the partner provider entity may still be operating according to a GDS-based standard. As such, the flight change indicated by the booking change data 811 requires a PNR 813 to be generated at the second database 122. Hence, the device 201 causes the booking data 801 to change to a "FIRST ORDER MODE" by communicating with the legacy system 112 to cause the PNR 813 to be generated at the second database 122, stored in association an indicator 817 indicating that the PNR 813 is a slave to the order data 803.

As depicted, in the first order mode for the booking data 801, the device 201 receives booking change data 821 for the booking data 801 that requires ticket data 824 to be generated at the second database 122. For example, such booking change data 821 may indicate that the booking data 801 is to be re-accommodated to the partner provider entity, for example, such that the partner provider entity is managing the booking data 801 and/or all flights associated with the booking data 801 are to be provided by the partner provider entity. As such, the device 201 causes the booking data 801 to change to a "SECOND ORDER MODE" by communicating with the legacy system 112 to cause the ticket data 824 to be generated at the second database 122, stored in association with an indicator 828 indicating that the ticket data 824 is a slave to the order data 803. However, the second order mode may be an intermediary mode; for example, as the partner provider entity is to manage the booking data 801, the booking data 801 is to be switched to a legacy mode.

As such, in the first order mode for the booking data 801, the device 201 communicates with the databases 121, 122 (e.g. via the OMS 111 and the legacy system 112) to slave the order data 803 to the PNR 813 and the ticket data 814, to change the booking data 801 to a "LEGACY MODE". For example, as depicted, in the legacy mode, the order data 803 is stored with an indicator 837 indicating that the order data 803 is a slave to the PNR 813 and the ticket data 814, and the PNR 813 and the ticket data 814 are respectively stored with indicator 847, 848 indicating that the PNR 813 and the ticket data 814 are masters to the order data 803.

Such mode switching may also occur when requests to switch modes are received at the device 201 and/or when booking change data requests are not supported by the OMS 111.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

The terms "about", "substantially", "essentially", "approximately", and the like, are defined as being "close to", for example as understood by persons of skill in the art. In some examples, the terms are understood to be "within 10%," in other examples, "within 5%", in yet further examples, "within 1%", and in yet further examples "within 0.5%".

Persons skilled in the art will appreciate that in some examples, the functionality of devices and/or methods and/or processes described herein can be implemented using pre-programmed hardware or firmware elements (e.g., application specific integrated circuits (ASICs), electrically erasable programmable read-only memories (EEPROMs), etc.), or other related components. In other examples, the functionality of the devices and/or methods and/or processes described herein can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative examples and modifications possible, and that the above examples are only illustrations of one or more examples. The scope, therefore, is only to be limited by the claims appended hereto.

What is claimed is:

1. A computing device comprising:
   at least one controller configured to:
   when booking data is received from a first client device in communication with an order management system (OMS), in a first order mode:
   cause the OMS to generate order data;
   cause a legacy system to generate corresponding passenger-related data one-way synchronized to the order data;
   change the order data according to change data from a second client device in communication with the legacy system, the order data redirected from the legacy system to the OMS; and
   one-way synchronize the corresponding passenger-related data with the order data as changed; and
   when the booking data is received from the second client device, in a legacy mode:
   cause the legacy system to generate passenger-related data;
   cause the OMS to generate corresponding order data that is one-way synchronized to the passenger-related data;

change the respective order data according to respective change data from the first client device that is redirected from the OMS to the legacy system; and
one-way synchronize the corresponding order data with the passenger-related data as changed.

2. The computing device of claim 1, wherein the first order mode and the legacy mode are particular to the booking data.

3. The computing device of claim 1, wherein the order data and the corresponding order data are stored at a first database in communication with the OMS, and the corresponding passenger-related data and the passenger-related data are stored at a second database in communication with the legacy system.

4. The computing device of claim 1, wherein the controller is further configured to:
one-way synchronize the corresponding passenger-related data with the order data as changed during a one-way synchronization from the OMS to the legacy system; and
one-way synchronize the corresponding order data with the passenger-related data as changed during a one-way synchronization from the legacy system to the OMS.

5. The computing device of claim 1, wherein the at least one controller is further configured to, in the first order mode:
prevent a change to the corresponding passenger-related data based on the change data being received at the legacy system.

6. The computing device of claim 1, wherein the at least one controller is further configured to, in the legacy mode:
prevent a change to the corresponding order data based on the respective change data being received at the OMS.

7. The computing device of claim 1, wherein the at least one controller is further configured to:
when the booking data is received from the first client device, in a second order mode, cause the legacy system to generate corresponding ticket data one-way synchronized to the order data.

8. The computing device of claim 1, wherein the at least one controller is further configured to, in the first order mode:
receive a request to switch from the first order mode to the legacy mode;
cause the legacy system to generate corresponding ticket data as a component of the corresponding passenger related-data; and
change the corresponding passenger related-data from being one-way synchronized to the order data, to the order data being one-way synchronized to the corresponding passenger related-data data.

9. The computing device of claim 1, wherein the at least one controller is further configured to, in the first order mode:
receive, from the second client device, booking change data that is not supported by the OMS;
cause the legacy system to generate corresponding ticket data as a component of the corresponding passenger related-data;
change the corresponding passenger related-data from being one-way synchronized to the order data, to the order data being one-way synchronized to the corresponding passenger related-data;
cause the legacy system to change the corresponding passenger related-data according to the booking change data; and
one-way synchronize the order data with the corresponding passenger related-data as changed.

10. A method comprising:
receiving, at one or more computing devices, booking data, the booking data received from one of: a first client device in communication with an order management system (OMS); and a second client device in communication with a legacy system;
when the booking data is received from the first client device, in a first order mode, via the one or more computing devices:
causing the OMS to generate order data;
causing the legacy system to generate corresponding passenger-related data one-way synchronized to the order data;
changing the order data according to change data from the second client device, the order data redirected from the legacy system to the OMS; and
one-way synchronizing the corresponding passenger-related data with the order data as changed; and
when the booking data is received from the second client device, in a legacy mode, via the one or more computing devices:
causing the legacy system to generate passenger-related data;
causing the OMS to generate corresponding order data that is one-way synchronized to the passenger-related data;
changing the respective order data according to respective change data from the first client device that is redirected from the OMS to the legacy system; and
one-way synchronizing the corresponding order data with the passenger-related data as changed.

11. The method of claim 10, wherein the first order mode and the legacy mode are particular to the booking data.

12. The method of claim 10, wherein the order data and the corresponding order data are stored at a first database in communication with the OMS, and the corresponding passenger-related data and the passenger-related data are stored at a second database in communication with the legacy system.

13. The method of claim 10, further comprising:
one-way synchronizing the corresponding passenger-related data with the order data as changed during a one-way synchronization from the OMS to the legacy system; and
one-way synchronizing the corresponding order data with the passenger-related data as changed during a one-way synchronization from the legacy system to the OMS.

14. The method of claim 10, further comprising, in the first order mode:
preventing a change to the corresponding passenger-related data based on the change data being received at the legacy system.

15. The method of claim 10, further comprising, in the legacy mode:
preventing a change to the corresponding order data based on the respective change data being received at the OMS.

16. The method of claim 10, further comprising:
when the booking data is received from the first client device, in a second order mode, causing the legacy system to generate corresponding ticket data one-way synchronized to the order data.

17. The method of claim 10, further comprising, in the first order mode:

receiving a request to switch from the first order mode to the legacy mode;

causing the legacy system to generate corresponding ticket data as a component of the corresponding passenger related-data; and changing the corresponding passenger related-data from being one-way synchronized to the order data, to the order data being one-way synchronized to the corresponding passenger related-data data.

18. The method of claim 10, further comprising, in the first order mode:

receiving, from the second client device, booking change data that is not supported by the OMS;

causing the legacy system to generate corresponding ticket data as a component of the corresponding passenger related-data;

changing the corresponding passenger related-data from being one-way synchronized to the order data, to the order data being one-way synchronized to the corresponding passenger related-data;

causing the legacy system to change the corresponding passenger related-data according to the booking change data; and one-way synchronizing the order data with the corresponding passenger related-data as changed.

19. A non-transitory computer-readable medium storing a computer program, wherein execution of the computer program is for:

receiving, at one or more computing devices, booking data, the booking data received from one of: a first client device in communication with an order management system (OMS); and a second client device in communication with a legacy system;

when the booking data is received from the first client device, in a first order mode, via the one or more computing devices:
  causing the OMS to generate order data;
  causing the legacy system to generate corresponding passenger-related data one-way synchronized to the order data;
  changing the order data according to change data from the second client device, the order data redirected from the legacy system to the OMS; and
  one-way synchronizing the corresponding passenger-related data with the order data as changed; and when the booking data is received from the second client device, in a legacy mode, via the one or more computing devices:
  causing the legacy system to generate passenger-related data;
  causing the OMS to generate corresponding order data that is one-way synchronized to the passenger-related data;
  changing the respective order data according to respective change data from the first client device that is redirected from the OMS to the legacy system; and
  one-way synchronizing the corresponding order data with the passenger-related data as changed.

20. The non-transitory computer-readable medium of claim 17, wherein the first order mode and the legacy mode are particular to the booking data.

* * * * *